United States Patent
Roos et al.

(10) Patent No.: US 10,507,840 B2
(45) Date of Patent: Dec. 17, 2019

(54) CONTROL OF AN COMBUSTION ENGINE IN A VEHICLE

(71) Applicant: Scania CV AB, Södertälje (SE)

(72) Inventors: Fredrik Roos, Segeltorp (SE); Mikael Ögren, Norsborg (SE); Olof Larsson, Stockholm (SE)

(73) Assignee: Scania CV AB, Södertälje (SE)

(*) Notice: Subject to any disclaimer, the term of this patent is extended or adjusted under 35 U.S.C. 154(b) by 0 days.

(21) Appl. No.: 15/320,961

(22) PCT Filed: Jun. 16, 2015

(86) PCT No.: PCT/SE2015/050696
§ 371 (c)(1),
(2) Date: Dec. 21, 2016

(87) PCT Pub. No.: WO2016/007071
PCT Pub. Date: Jan. 14, 2016

(65) Prior Publication Data
US 2017/0158204 A1    Jun. 8, 2017

(30) Foreign Application Priority Data
Jul. 7, 2014 (SE) ..................... 1450870

(51) Int. Cl.
*B60W 50/00* (2006.01)
*B60W 30/14* (2006.01)
(Continued)

(52) U.S. Cl.
CPC ........ *B60W 50/0097* (2013.01); *B60W 10/06* (2013.01); *B60W 10/18* (2013.01);
(Continued)

(58) Field of Classification Search
None
See application file for complete search history.

(56) References Cited

U.S. PATENT DOCUMENTS 9,598,082 B2    3/2017    Kuroki et al.
9,694,821 B2    7/2017    Suzuki et al.
(Continued)

FOREIGN PATENT DOCUMENTS

DE    102009045567 A1    4/2011
EP    2540589 A2         1/2013
(Continued)

OTHER PUBLICATIONS

International Search Report of the International Searching Authority for PCT/SE2015/050696 dated Nov. 4, 2015.
(Continued)

*Primary Examiner* — Christian Chace
*Assistant Examiner* — Kyung J Kim
(74) *Attorney, Agent, or Firm* — Moore & Van Allen PLLC; W. Kevin Ransom

(57) ABSTRACT

Methods, systems, and computer program products are provided for control of a combustion engine in a vehicle. At least one future speed profile for an actual speed of the vehicle during a road section is simulated based on information about the road section, and that coasting will be applied during the road section. An applicability for coasting during the road section is evaluated. Subsequently, it is evaluated whether the combustion engine may be shut down during a coasting for at least a part of the road section. The evaluation of the shutdown of the combustion engine is based on whether one or several system conditions for engine shutdown have been met, on one or several properties for one or several brake systems in the vehicle, and on a shutdown period, when the combustion engine could be shut down. The combustion engine is then controlled based on this evaluation.

19 Claims, 5 Drawing Sheets

(51) Int. Cl.
  *B60W 30/18* (2012.01)
  *B60W 40/076* (2012.01)
  *B60W 40/072* (2012.01)
  *B60W 10/06* (2006.01)
  *B60W 10/18* (2012.01)

(52) U.S. Cl.
  CPC .... *B60W 30/146* (2013.01); *B60W 30/18072* (2013.01); *B60W 40/072* (2013.01); *B60W 40/076* (2013.01); *B60W 2030/1809* (2013.01); *B60W 2510/0676* (2013.01); *B60W 2520/10* (2013.01); *B60W 2550/142* (2013.01); *B60W 2550/146* (2013.01); *B60W 2720/103* (2013.01); *B60Y 2200/92* (2013.01); *Y10S 903/905* (2013.01)

(56) References Cited

U.S. PATENT DOCUMENTS

| | | | |
|---|---|---|---|
| 2011/0136620 A1 | 6/2011 | Gibson et al. | |
| 2011/0174559 A1* | 7/2011 | Saito | B60K 6/48 180/65.27 |
| 2012/0046841 A1 | 2/2012 | Wurthner et al. | |
| 2012/0265427 A1 | 10/2012 | Petridis et al. | |
| 2013/0096792 A1 | 4/2013 | Maier et al. | |
| 2013/0158838 A1* | 6/2013 | Yorke | B60W 10/06 701/103 |
| 2013/0190998 A1 | 7/2013 | Polimeno et al. | |

FOREIGN PATENT DOCUMENTS

| | | |
|---|---|---|
| EP | 2679461 A1 | 1/2014 |
| EP | 2620339 A1 | 7/2014 |
| GB | 2508670 A | 6/2014 |
| WO | 2010069440 A1 | 6/2010 |
| WO | 2012169960 A1 | 12/2012 |
| WO | 20120169961 A1 | 12/2012 |
| WO | 2014003654 A1 | 1/2014 |
| WO | 2014055016 A1 | 4/2014 |
| WO | 2014060825 A1 | 4/2014 |
| WO | 2014068719 A1 | 5/2014 |
| WO | 2014074050 A1 | 5/2014 |

OTHER PUBLICATIONS

Written Opinion of the International Searching Authority of PCT/SE2015/050696 dated Nov. 4, 2016.
International Preliminary Report on Patentability for International Patent Application No. PCT/SE2015/050696 dated Jan. 10, 2017.
Korean Office Action for Korean Patent Application No. 10-2017-7002621 dated May 30, 2018.
SCANIA CV AB, Swedish Application No. 1450870-9, Office Action, Feb. 12, 2015.
Decision of Rejection from the Korean Intellectual Property Office for Korean Patent Application No. 10-2017-7002621 dated Sep. 21, 2018.

* cited by examiner ized fuel consumption is obtained within reasonable speed limits. The engine 101 may also be controlled by a driver of the vehicle.

CONTROL OF AN COMBUSTION ENGINE IN A VEHICLE

CROSS-REFERENCE TO RELATED APPLICATION(S)

This application is a national stage application (filed under 35 § U.S.C. 371) of PCT/SE15/050696, filed Jun. 16, 2015 of the same title, which, in turn claims priority to Swedish Application No. 1450870-9, filed Jul. 7, 2014 of the same title; the contents of each of which are hereby incorporated by reference.

FIELD OF THE INVENTION

The present invention relates to methods, systems and computer program products for control of a combustion engine in a vehicle during a road section.

BACKGROUND OF THE INVENTION

For motor vehicles, such as cars, trucks and buses, the cost of fuel constitutes a significant expense for the vehicle's owner or user. For a hauling company, for example, the main expenditure items for the day-to-day operation of a vehicle consist, apart from the cost of acquisition of the vehicle and the vehicle's driver's salary, of costs of repair and maintenance and fuel for the propulsion of the vehicle. The fuel cost may impact the profitability of the hauling company to a great extent. Therefore, a number of different systems have been developed to reduce fuel consumption, such as efficient engines and fuel economical cruise controls.

FIG. 1 schematically shows a powertrain in a vehicle 100. The powertrain comprises one or several engines, for example comprising a combustion engine 101 and/or an electric motor 121, which in a customary manner, via an output shaft 102 on the one or several engines 101, 121, usually via one or several flywheels, is connected to at least one input shaft 109 in a gearbox 103, via a clutch 106. The clutch 106 may e.g. consist of an automatically controlled clutch, and may be controlled by the vehicle's control system via a control device 130. The control device 130 may also control the gearbox 103.

The gearbox 103 is here illustrated schematically as one device. However, the gearbox 103 may also physically consist of several cooperating gearboxes, for example a so-called range gearbox, a main gearbox and a split gearbox, arranged along the vehicle's powertrain. The gearbox may comprise a suitable number of gears. Today's gearboxes for heavy goods vehicles usually have twelve forward gears, two reverse gears and one neutral gear. If the gearbox 103 consists, physically, of several part-gearboxes as described above, these twelve propulsive gears are distributed with two gears in the range gearbox, three gears in the main gearbox and two gears in the split gearbox, jointly constituting twelve gear positions (2*3*2=12). The vehicle 100 further comprises drive shafts 104, 105, which are connected to the vehicle's driving wheels 110, 111, and which are operated by an output shaft 107 from the gearbox 103, via a shaft gear 108, such as e.g. a customary differential.

The vehicle 100 further comprises various different brake systems 170, such as a customary brake system, which may comprise brake plates with associated brake pads (not shown) arranged next to each wheel. The vehicle 100 may also comprise one or several additional/auxiliary brakes, such as exhaust brakes, retarders or decompression brakes (not displayed). The engine 101 may be controlled based on instructions from a cruise control, in order to maintain a constant actual vehicle speed and/or to vary the actual vehicle speed, for example in such a manner that an optimized fuel consumption is obtained within reasonable speed limits. The engine 101 may also be controlled by a driver of the vehicle.

The vehicle may also comprise a system 140 for monitoring the status and charging of one or several batteries, which may be used, for example, at the start of the combustion engine 101 with the help of a starting engine, at operation of the engine when the electric motor 121 is used to operate the vehicle, or for operation of one or several systems in the vehicle.

The vehicle may also comprise one or several systems using compressed air and/or hydraulic pressure, and therefore one or several compressors 150 may be comprised in the vehicle.

The vehicle may also comprise one or several devices 160 for temperature monitoring and/or temperature control. For example, the temperature of the one or several engines 101, 121, the temperatures for one catalyst in an exhaust purification device and/or the temperatures in a driver's cabin may be monitored and/or controlled with the use of the one or several devices 160 for temperature monitoring and/or temperature control.

SUMMARY OF THE INVENTION

In the event of e.g. downhill slopes, or in situations where the vehicle must reduce its actual speed, fuel savings have historically been made through a reduced request of positive engine torque, or with the help of dragging. The reduced request of positive engine torque entails that the force driving in the direction of travel, emitted by the combustion engine via the driving wheels, is reduced, e.g. through reduced fuel injection into the engine 101, which reduces the fuel consumption.

Dragging means driving the vehicle with a closed powertrain, i.e. with the combustion engine connected to the vehicle's driving wheels, at the same time as the fuel injection to the combustion engine is closed. One advantage with this type of measure is, that since the fuel injection to the combustion engine is closed, the combustion engine's consumption is equal to zero. This measure does, however, also entail that the combustion engine will be driven by the vehicle's driving wheels via the powertrain, and so-called "dragging" is thus achieved, whereat the combustion engine's internal losses give rise to a braking action, i.e. engine braking of the vehicle.

A reduction of the requested engine torque and dragging does indeed reduce fuel consumption, but this reduction is not always optimal, because the reduced engine torque nevertheless often consumes more fuel than necessary, and because the dragging also adds an engine braking, which is not fuel economical, of the vehicle.

Coasting has been presented in order to further reduce the fuel consumption. Coasting entails, as described in more detail below, that the vehicle's engine is disconnected from the vehicle's driving wheels. This may also be described as opening of the powertrain. Disconnection of the driving wheels from the engine may, for example, be achieved by putting the gearbox in a neutral gear, or by opening the clutch. At coasting, the engine is only supplied with fuel for idling of the engine.

It is one objective of the present invention to further reduce the fuel consumption for the vehicle.

According to the present invention, a method and a system for control of a combustion engine in a vehicle, during a road section, are provided. The vehicle comprises one or several engines, and one or several brake systems. A minimum permitted speed $v_{min}$ and a maximum permitted speed $v_{max}$ are defined for the road section, in between which an actual speed $v_{act}$ of the vehicle should be kept.

According to the invention, at least one future speed profile $v_{sim\_coast}$ for the actual speed $v_{act}$ of the vehicle during the road section is simulated. The simulation is carried out where the road section is ahead of the vehicle, and based on information about the road section. The simulation assumes that coasting will be applied at least partly during the road section.

Subsequently, an applicability for coasting is evaluated, wherein coasting is deemed applicable for a speed profile $v_{sim\_coast}$, if its value is greater than the lowest permitted speed $v_{min}$, at least during an initial part of the road section.

Subsequently, it is evaluated whether the combustion engine may at least partly be shut down during the coasting (i.e. whether the combustion engine may be shut down during the coasting for at least a part of the road section). The evaluation of combustion engine shutdown is based at least on whether one or several system conditions for the engine shutdown have been fulfilled, on one or several properties of one or several brake systems in the vehicle, and on a turning off time period $T_{ICE\_off}$ when the combustion engine could be shut down.

The combustion engine is then controlled based on this evaluation of turning off the engine.

Thanks to the present invention, it may be reliably determined, whether or not a future coasting may be carried out with the combustion engine shut down. In order for the engine to be shut down, one or several defined system conditions must be met, thanks to which the function of the corresponding vehicle system is secured.

For example, according to one embodiment of the present invention, one or several of the following system conditions should be met when the engine is shut down:

a) an air pressure $P_{air\_brake}$ in one or several brake systems exceeds a pressure threshold value $P_{air\_brake\_th}$; $P_{air\_brake} > P_{air\_brake\_th}$;

b) an air pressure $P_{air\_act}$ which is used to actuate one or several devices in the vehicle, such as a gearbox, a clutch, an actuator at the engine for example for EGR and/or exhaust braking, or a level control system for the suspension, exceeds a pressure threshold value $P_{air\_act\_th}$; $P_{air\_act} > P_{air\_act\_th}$;

c) a charging status L for one or several batteries in the vehicle exceeds a charging value $L_{th}$; $L > L_{th}$;

d) an engine temperature $T_e$ is within an engine temperature interval $[T_{e\_min}, T_{e\_max}]$; $T_{e\_min} < T_e < T_{e\_max}$;

e) a catalyst temperature $T_c$ is within a catalyst temperature interval $[T_{c\_min}, T_{c\_max}]$; $T_{c\_min} < T_c < T_{c\_max}$;

f) a cabin temperature $T_h$ is within a cabin temperature interval $[T_{h\_min}, T_{h\_max}]$; $T_{h\_min} < T_h < T_{h\_max}$; and g) a powertrain status D indicates that a powertrain in the vehicle has an acceptable function.

The one or several properties for the one or several brake systems, which properties must be considered when evaluating the engine shutdown, may here, for example, comprise a braking force provided by, and/or a cooling requirement for, the respective one or several brake systems. Certain brake systems require that the combustion engine is running when the braking occurs. This means that the present invention provides a traffic-safe determination of whether the combustion engine may be shut down, since regard is had to whether the one or several brake systems that may be used during the coasting require that the combustion engine is running.

Additionally, the shutdown period $T_{ICE\_off}$ may be sufficiently long, that is to say it may exceed a threshold value $T_{ICE\_off\_th}$, for the engine to be shut down, which means that inconsistent engine shutdowns and engine start-ups may be avoided. Accordingly, the engine is shut down only if it may remain shut down as long as the shutdown of the engine is perceived as logical and reasonable by the driver of the vehicle. Here, the shutdown period $T_{ICE\_off}$, during which the combustion engine could be shut down, may be determined by way of analysis of among others the at least one future speed profile $v_{sim\_coast}$. Since the at least one future speed profile $v_{sim\_coast}$ is based on information about the road section ahead, such as for example on the road gradient, inconsistent engine shutdowns may be avoided where the shutdown period T=off may be reliably determined.

By using the present invention the objective is achieved, that is to say the fuel consumption is reduced, by way of reliably ensuring that one or several of the vehicle's engines may be shut down with good driveability, during at least parts of a road section.

When the engine is shut down, additional fuel is saved compared to when, for example, coasting with an open powertrain is used, since no idling fuel is then consumed. In this document, a shutdown engine is defined as an engine which has zero engine speed; ω=0. In a corresponding manner, an engine shutdown is defined as a measure that results in the engine speed after the measure becoming zero; ω=0. In addition, coasting with a shutdown engine is considerably more advantageous for the exhaust treatment system than coasting while idling, since the exhaust treatment system retains the heat better with a shutdown engine, than when cooling air flows through the exhaust treatment system at idling. This more even temperature for the exhaust treatment system also contributes to a reduced fuel consumption, since so-called heating modes for the engine may then be avoided. At heating modes, fuel is used to actively heat a catalyst in the exhaust treatment system, which naturally contributes to the fuel consumption. When the engine is shut down, the exhaust treatment system retains heat better, so that the heating modes may thus be avoided.

The present invention ensures that the engine shutdown may be carried out based on well supported decisions, since the decisions are based on information about the road section ahead, during which the potential engine shutdowns will occur. Thus, a reliable evaluation may be carried out as to whether coasting is applicable, and whether it is suitable that the combustion engine is shut down during coasting.

The present invention may be implemented with little added complexity in the vehicle, since the invention may use data already available in other systems in the vehicle, such as information about the road section ahead, comprising for example road gradient, to which the cruise control in the vehicle usually already has access.

According to several embodiments of the present invention, one or several simulations of future speed profiles $v_{sim\_coast}$ for an actual speed of the vehicle may be carried out, which means that the system has very good control over how the vehicle will behave during the road section ahead of the vehicle. Based on these simulations, well-founded decisions relating to engine shutdowns may then be taken.

The present invention may be used both for pedal driving, i.e. when the driver regulates the torque demand from the engine, and for cruise control driving. The term pedal driving comprises, here and in this document, use off substantially all kinds of controls designed adapted to control torque request, such as, for example, an accelerator pedal or a hand gas device.

BRIEF DESCRIPTION OF DRAWINGS

The invention will be illustrated in more detail below, along with the enclosed drawings, where similar references are used for similar parts, and where.

DETAILED DESCRIPTION OF THE INVENTION

Figure 2:
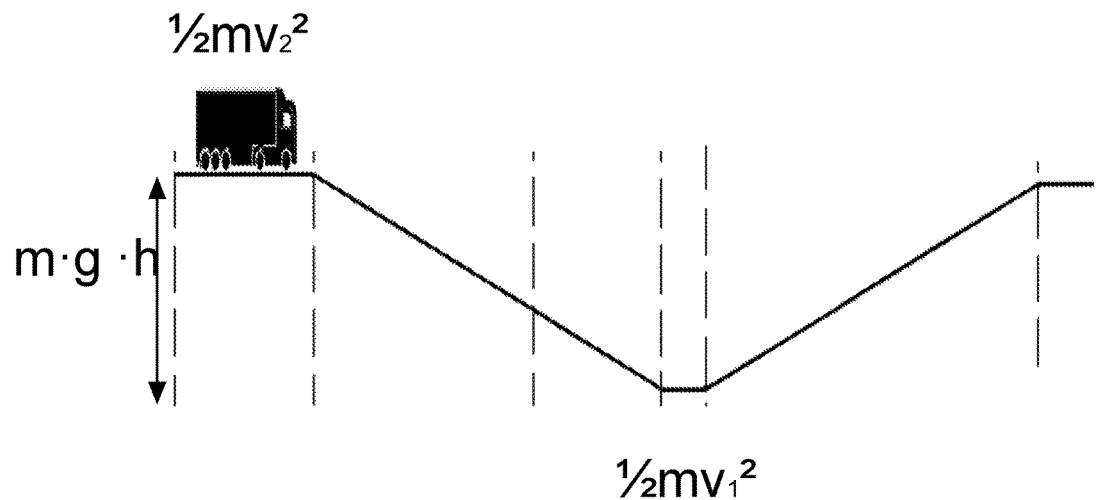
FIG. 2 schematically shows a driving situation.

FIG. 2 shows schematically a non-limiting example of a driving situation, a downhill slope, where the present invention may be applied. The invention may also be applied in other driving situations, for example at a speed reduction, which may occur on a flat road. However, the driving situation in FIG. 2 will here, for pedagogical reasons, be used to describe principles used by the invention.

For the vehicle in FIG. 2, an energy relationship may be set up for the driving situation:

$$mgh = (\tfrac{1}{2}mv_2^2 - \tfrac{1}{2}mv_1^2) + (F_{air} + F_{rr} + F_{eng} + F_{gb} + F_{axle/nav}) \cdot s \quad \text{(equation 1)}$$

where:
mgh is the vehicle's potential energy;
$\tfrac{1}{2}mv_2^2$ is the vehicle's kinetic energy up on the top of the hill;
$\tfrac{1}{2}mv_1^2$ is the vehicle's kinetic energy at the end of the slope;
$F_{air}$ is the vehicle's air resistance;
$F_{rr}$ is the vehicle's rolling resistance;
$F_{eng}$ is the engine friction;
$F_{gb}$ is the gearbox friction;
$F_{axle/nav}$ is friction in the rear shaft, seals and wheel bearings; and
s is the distance between the top of the hill and the end of the slope.

As illustrated by equation 1, a number of forces $F_{air}$, $F_{rr}$, $F_{eng}$, $F_{gb}$, and $F_{axle/nav}$ act against the vehicle's movements.

Figure 3:
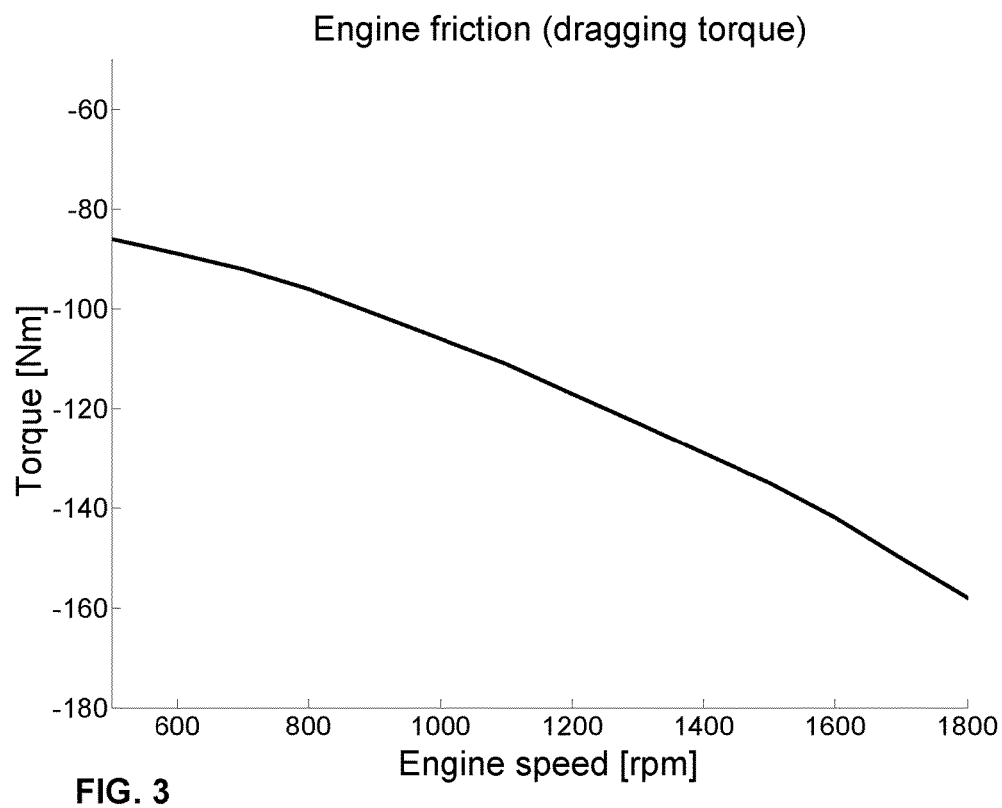
FIG. 3 shows a diagram of engine friction as a function of engine speed.

FIG. 3 shows an example of engine friction for a truck engine. Here it is shown that the negative torque, corresponding to the engine friction $F_{eng}$, which counteracts the movement of the vehicle, increases with an increased engine speed in the engine 101 (note that the y-axis has a negative gradation in FIG. 3). In the reverse, a reduced engine speed in the engine results in a reduced force for the engine friction $F_{eng}$, that is to say a reduced negative torque.

In this document, coasting means that the vehicle's engine 101 is disconnected from the vehicle's driving wheels 110, 111, i.e. that the powertrain is opened. This disconnection of the driving wheels 110, 111 from the engine 101, also called opening of the powertrain, may e.g. be achieved by putting the gearbox 103 in a neutral gear or by opening the clutch 106. In other words, substantially no power is transmitted from the engine 101 to the driving wheels 110, 110 [sic: 111] during coasting. Disconnection of one or several of the engines 101, 121 from the vehicle's 100 driving wheels 110, 111 when the vehicle 100 is moving is referred to in this document as coasting.

Coasting according to the present invention means that the forces acting against the vehicle's movement are significantly reduced, since the force of the engine friction $F_{eng}$ in this case decreases to a value substantially equal to zero (0). Therefore, coasting may significantly reduce fuel consumption through this reduction of the resistance against the vehicle.

This means, that from a fuel perspective it is often more advantageous to drive the vehicle with an open powertrain, i.e. by coasting, than with dragging, i.e. when the powertrain is closed while the fuel injection to the engine 101 is closed. The reason for this is that the limited amount of fuel required to keep the combustion engine in operation when the combustion engine is disconnected, is compensated for by the fact that the vehicle may continue with a disconnected combustion engine for a longer distance, e.g. after completing a downhill slope. This is due to, among others, the vehicle achieving a higher speed on e.g. the downhill slope when it is driven with a disconnected combustion engine, compared to when the vehicle is driven with a closed powertrain without fuel injection. At an engine shutdown used by the present invention no fuel at all is supplied to the engine.

In addition, when coasting, the force counteracting the vehicle being driven will be lower when the vehicle's combustion engine is disconnected from the driving shaft, since there is no engine braking force that counteracts the progress of the vehicle. This means that the vehicle will retard more slowly, e.g. when the vehicle reaches the end of a downhill slope, which in turn means that coasting may often be used over a relatively long distance, e.g. after the end of a downhill slope. Thus a significant reduction of fuel consumption is obtained.

The present invention is intended to further reduce fuel consumption at for example coasting, by way of turning off one or several of the engines in the vehicle if possible. When one or several engines are shut down, the fuel consumption decreases by the idling fuel that would have been required to operate the one or several engines, if they had not been shut down, that is to say if they had been kept running, during the coasting.

Figure 4:
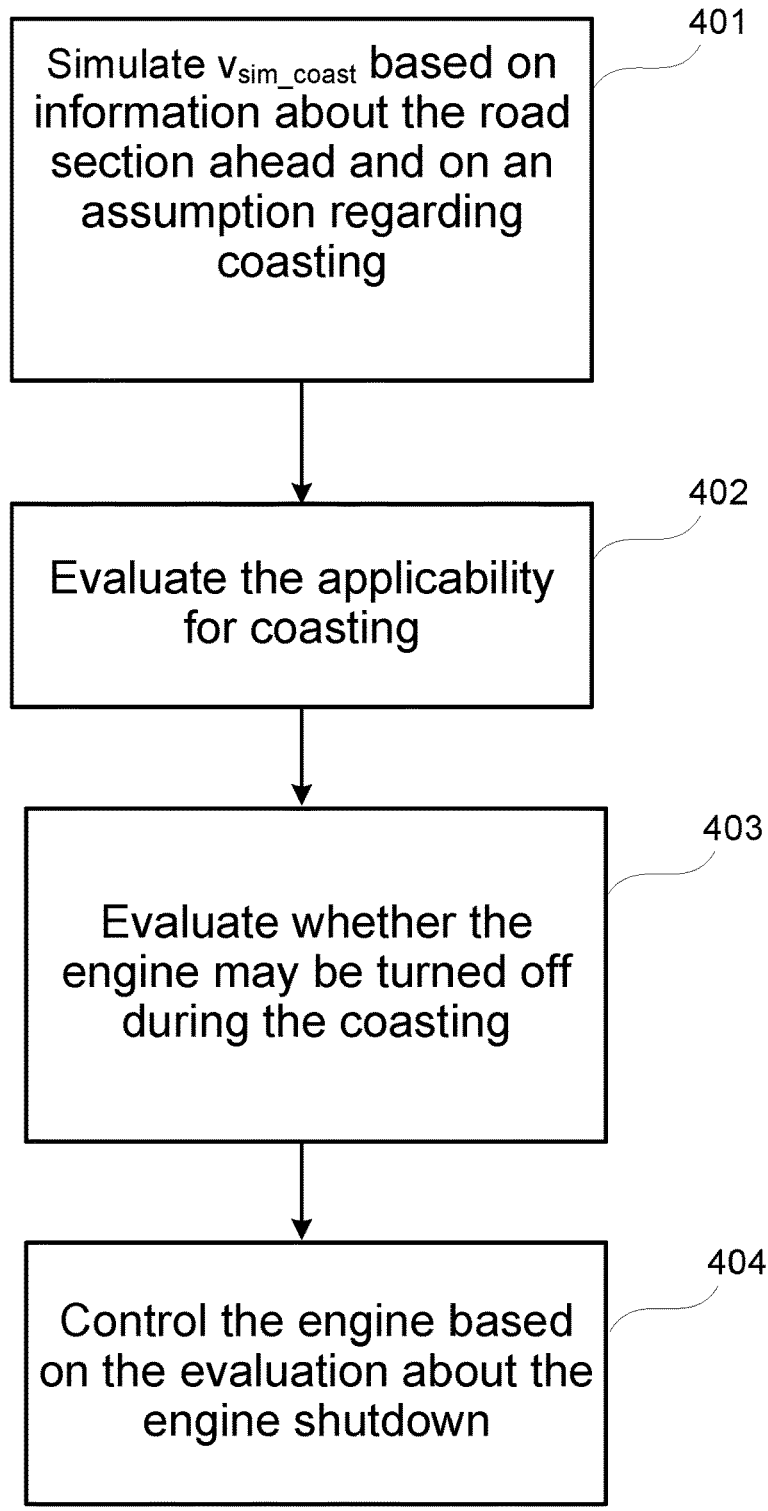
FIG. 4 shows a flow chart for the method according to the invention.

FIG. 4 shows a flow chart for the method according to the present invention. In a first step 401 of the method, for example with the use of the simulation unit 331 described below (FIG. 1), at least one future speed profile $v_{sim\_coast}$ is simulated for an actual speed vast during the road section for the vehicle 100. The simulation is carried out when the road section is ahead of the vehicle 100, and each one of the at least one future speed profiles $v_{sim\_coast}$ is based on information about the road section ahead, and assumes that coasting will at least partly be applied during the road section.

In a second step 402 of the method, an applicability for coasting during the road section is evaluated, for example with the use of the first evaluation unit 132 (FIG. 1) described below. Coasting is here deemed applicable for a speed profile $v_{sim\_coast}$, if its value is greater than a lowest permitted speed $v_{min}$, defined for the road section at least during an initial part of the road section.

In a third step 403 of the method, it is evaluated, for example with the use of the second evaluation unit 133 (FIG. 1) described below, whether the combustion engine 101 may at least partly be shut down during the coasting. The evaluation of the engine shutdown is based at least on whether one or several system conditions for engine shutdown are met, on one or several properties for the one or several brake systems 170, and on a shutdown period $T_{ICE\_off}$, during which the combustion engine 101 could be shut down.

According to one embodiment, the shutdown period $T_{ICE\_off}$ must be sufficiently long for the engine to be shut down, which means that inconsistent engine shutdowns and engine starts may be avoided. The shutdown period $T_{ICE\_off}$, during which the combustion engine could be shut down, may then, for example, be determined by way of analysis of among others the at least one future speed profile $v_{sim\_coast}$. Subsequently, it is verified whether the shutdown period $T_{ICE\_off}$ exceeds a threshold value $T_{ICE\_off\_th}$, which ensures that it is sufficiently long not to irritate the driver.

In a fourth step 404 of the method, the combustion engine 101 is controlled, for example with the use of the engine control unit 134 (FIG. 1) described below, based on the evaluation of the engine shutdown.

Thus, it may be determined, in a reliable and well-founded manner, whether or not a future coasting may be carried out with the combustion engine shut down. First, it is verified whether or not the general conditions for the use of coasting are met, whereat it may be determined whether or not there is an applicability for coasting. Subsequently, it is verified whether the combustion engine may also be shut down during the coasting. In order for the engine to be shut down, one or several defined system conditions must be met, thanks to which the function of the corresponding vehicle system is secured.

Certain brake systems require that the combustion engine is running when braking occurs, for example brake systems that need to be cooled down during the braking, and/or which require that the compressor is active during the braking. Therefore, the present invention provides a traffic-safe determination as to whether the combustion engine may be shut down, since regard is had to, by way of analysis of the at least one future speed profile $v_{sim\_coast}$, whether the one or several brake systems that may be used during the coasting require that the combustion engine is running.

In addition, the shutdown period $T_{ICE\_off}$ must be sufficiently long, that is to say it must exceed a threshold value, in order for the engine to be shut down, which means that inconsistent engine shutdowns and engine starts may be avoided. Thus, the engine is only shut down if it may remain shut down during the shutdown period $T_{ICE\_off}$, which has a duration ensuring that the engine shutdown is perceived as logical and reasonable by the driver of the vehicle. Repeated shutdowns and starts of the engine, that is to say repeated shutdowns and starts of the engine with relatively brief intervals, may irritate the driver, have a negative impact on the driveability of the vehicle, and increase the wear of the vehicle components, and may also be perceived as inconsistent by the driver. This is prevented by the present invention, which ensures a good driveability, reduced wear and that the driver perceives the control of the engine as intuitively easy to understand and logical.

Accordingly, a safe, logical and comfortable driving of the vehicle is achieved with one or several engines shut down, which also reduces the fuel consumption in the vehicle.

The one or several system conditions, which must be met for the engine shutdown to occur, are, according to one embodiment of the present invention:

a) an air pressure $P_{air\_brake}$ in one or several brake systems exceeds a pressure threshold value $P_{air\_brake\_th}$; $P_{air\_brake} > P_{air\_brake\_th}$;

b) an air pressure $P_{air\_act}$ which is used for the above described actuation of one or several devices in the vehicle exceeds a pressure threshold value $P_{air\_act\_th}$; $P_{air\_act} > P_{air\_act\_th}$;

c) a charging status L for one or several batteries in the vehicle exceeds a charging value $L_{th}$; $L > L_{th}$;

d) an engine temperature $T_e$ is within an engine temperature interval $[T_{e\_min}, T_{e\_max}]$; $T_{e\_min} < T_e < T_{e\_max}$;

e) a catalyst temperature $T_c$ is within a catalyst temperature interval $[T_{c\_min}, T_{c\_max}]$; $T_{c\_min} < T_c < T_{c\_max}$;

f) a cabin temperature $T_h$ is within a cabin temperature interval $[T_{h\_min}, T_{h\_max}]$; $T_{h\_min} < T_h < T_{h\_max}$; and g) a powertrain status D indicates that a powertrain in the vehicle has an acceptable function.

The acceptable function of the powertrain status D may here mean, that no diagnostic system in the vehicle has discovered any error in any vital powertrain component, that is to say in any component, which is important in driving the vehicle.

Figure 1:
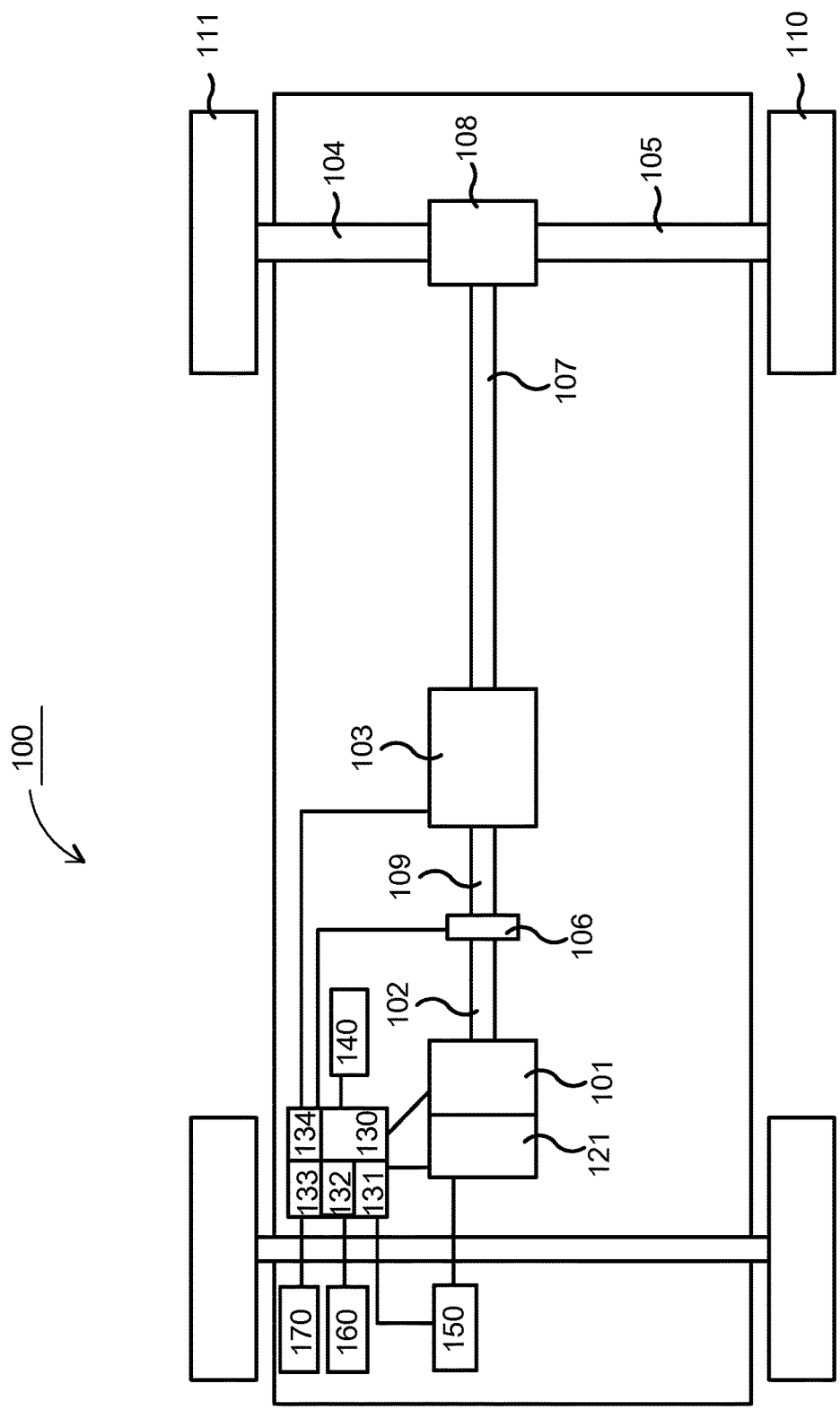
FIG. 1 shows a schematic view of an example vehicle.

The vehicle 100 displayed in FIG. 1 comprises, when the present invention is implemented in the vehicle, at least one control device 130, which may be arranged to control a number of different functions in the vehicle, such as among others the engines 101, 121, the clutch 106, the gearbox 103, the compressor 150, the charging of the one or several batteries with at least one charging device 140 and/or the temperature control devices 160.

As described in further detail below, the control device 130 in the system comprises, according to the present invention, the simulation unit 131, the first evaluation unit 132, the second evaluation unit 133 and the engine control unit 134.

According to one aspect of the present invention, a system is provided, which, during a road section, is arranged for control of a combustion engine in a vehicle comprising one or several engines 101, 121 and one or several brake systems 170. A minimum permitted speed venin and a maximum permitted speed $v_{max}$ are defined for the road section, in between which an actual speed $v_{act}$ of the vehicle 100 should be kept.

The system comprises the simulation unit 131, which is arranged to simulate at least one future speed profile $v_{sim\_coast}$ for the actual speed $v_{act}$ of the vehicle 100 during the road section. The simulation is carried out when the road section is ahead of the vehicle 100 and is based on information about the road section. The simulation assumes that coasting will be applied at least partly during the road section.

The system also comprises the first evaluation unit 132, which is arranged to evaluate an applicability for coasting. Coasting is here deemed applicable for a speed profile $v_{sim\_coast}$, if its value is greater than the minimum permitted speed $v_{min}$ at least during an initial part of the road section.

The system also comprises the second evaluation unit 133, which is arranged to evaluate whether the combustion engine 101 may be shut down at least partly during the coasting. The evaluation of the combustion engine 101 shutdown is based at least on whether one or several system conditions for engine shutdown have been met, on one or several properties for one or several brake systems in the vehicle 170, and on a shutdown period $T_{ICE\_off}$, when the combustion engine 101 could be shut down.

According to one embodiment, the shutdown period $T_{ICE\_off}$ must here be sufficiently long for the engine to be shut down. The shutdown period $T_{ICE\_off}$, during which the combustion engine could be shut down, may for example be determined based on among others the appearance of the at least one future speed profile $v_{sim\_coast}$. The shutdown period $T_{ICE\_off}$ may then be compared with a threshold value $T_{ICE\_off\_th}$, in order to ensure that it is sufficiently long.

The system also comprises an engine control unit 143, which is arranged to control the combustion engine 101 based on an evaluation of the engine shutdown.

The system may also be arranged to perform each of the embodiments of the present invention described in this document, so that the system for the respective embodiments obtains the advantages for the respective embodiments described herein.

Here, and in this document, devices are often described as being arranged to carry out steps in the method according to the invention. This also comprises that the devices are adapted and/or set up to carry out these method steps.

As a person skilled in the art will realize, the control device 130 may also be arranged to control of communicate with one or several additional systems in the vehicle.

The at least one control device 130 is drawn in the figure as comprising separately marked units 131, 132, 133, 134. These units 131, 132, 133, 134 may also be logically separate, but physically implemented in the same unit, or may be both logically and physically jointly arranged/implemented. For example, these units 131, 132, 133, 134 may correspond to different groups of instructions, for example in the form of program code, which is fed into, and used by a processor, when the respective unit carries out the respective corresponding method step.

The simulation is thus carried out on the road section ahead of the vehicle, and is based on the information about the road section ahead. Thus, one or several future speed profiles $v_{sim}$ are simulated for the vehicle's actual speed, wherein the simulation is carried out in such a manner that it is based on the vehicle's current position and situation and looks ahead over the road section, whereat the simulation is carried out, among others, based on the above described information about the road section.

Subsequently, an evaluation of the applicability for coasting is carried out, as well as of whether the combustion engine 101 may be shut down at least partly during the road section, whereat such evaluation is based at least on the at least one future speed profile $v_{sim\_coast}$. By basing the evaluation on the simulations and thus on the information about the road section, well supported and reliable decisions are obtained regarding the potential engine shutdowns.

For example, the simulation may be carried out in the vehicle with a predetermined frequency, such as for example with the frequency 1 Hz, which means that a new simulation result is ready every second. The road section for which the simulation is carried out comprises a predetermined distance ahead of the vehicle, which may for example be 1 km long. The road section may also be seen as a horizon for which the simulation is carried out, ahead of the vehicle.

The simulation may be based on one or several of a number of parameters, such as information about the road section, a used transmission mode in the vehicle, one or several of a driving style, a current actual vehicle speed, a vehicle weight, an air resistance, a rolling resistance, a gearing ratio in the gearbox and/or the powertrain, a wheel radius and/or at least one engine property, such as a maximum and/or a minimum engine torque.

The information about the road section may comprise among others the road gradient $\alpha$ and/or a curvature for the road section. The road gradient $\alpha$ and/or the curvature may be obtained in a number of different ways. The road gradient $\alpha$ and/or the curvature may be determined based on map data, e.g. from digital maps comprising topographical information, in combination with positioning information, such as GPS information (Global Positioning System). With the help of positioning information the vehicle's position in relation to the map data may be determined, so that the road gradient $\alpha$ may be extracted from the map data.

In several cruise control systems today, map data and positioning information is used in the cruise control. Such systems may thus provide map data and positioning information to the system according to the present invention, which means that the added complexity for the determination of the road gradient $\alpha$ and/or curvature is minimized.

The road gradient $\alpha$ and/or curvature on which the simulations are based, may also be obtained by way of estimating the road gradient experienced by the vehicle at the time of simulation. There are many ways of estimating this road gradient $\alpha$, e.g. based on an engine torque in the vehicle, on an acceleration of the vehicle, on an accelerometer, on GPS information, on radar information, on camera information, on information from another vehicle, on positioning-related and road gradient information stored previously in the vehicle, and/or on information obtained from traffic systems related to said road section. In systems where information exchange between vehicles is used, the road gradient estimated by a vehicle may also be provided to other vehicles, either directly or via an intermediate unit, such as a database or similar.

The knowledge/information may also be obtained based on radar information, on camera information, on information from another vehicle, on positioning information stored previously in the vehicle and, for example, on road gradient and/or curvature information, or on information obtained from traffic systems related to the road section. In a system where information exchange between vehicles is used, information determined by one vehicle may also be provided to other vehicles, either directly or via an intermediate unit, such as a database or similar.

Obstacles in a future road section, for example in the form of junctions, traffic jams, accidents or similar, may also be identified and used as information about the road section, whereat that future deceleration may be estimated.

According to one embodiment of the present invention, the shutdown of the combustion engine 101 occurs while the vehicle is coasting, that is to say when there is an opening of a clutch 106 in the vehicle and/or when a neutral gear is used in the gearbox 103 in the vehicle. In this document, the present invention is thus described in relation to an engine shutdown, that is to say where an engine obtains zero engine speed; $\omega=0$; which occurs during coasting. For vehicles with more than one engine, one or several of these engines may be coasting. As an example, a hybrid powertrain may be configured in such a way that the combustion engine may be disconnected with the clutch 106, while the electric motor is arranged between the clutch 106 and the gearbox 103. Accordingly, in this configuration, the use of a neutral gear in the gearbox means that both the combustion engine and the electric motor are coasting, while an activation of the clutch means that only the combustion engine is coasting.

According to one embodiment of the present invention, the evaluation 403 of whether the combustion engine 101 may be shut down comprises an evaluation of one or several system conditions.

For example, the evaluation 403 may then comprise a comparison of a pressure P with a pressure threshold value $P_{th}$. The pressure P may here correspond to above mentioned air pressure $P_{air\_brake}$ for one or several brake systems 170, whereat the comparison indicates whether such pressure exceeds a pressure threshold value $P_{air\_brake\_th}$; $P_{air\_brake} > P_{air\_brake\_th}$.

The pressure P may here correspond to above mentioned air pressure $P_{air\_act}$ which is used to actuate one or several devices in the vehicle, whereat the comparison indicates whether such pressure exceeds a pressure threshold value $P_{air\_act\_th}$; $P_{air\_act} > P_{air\_act\_th}$. This actuation pressure $P_{air\_act}$ may, for example, be used for actuation of several actuators for the engine, for example for an exhaust gas recirculation valve (EGR) or for an exhaust braking device. The actuation pressure $P_{air\_act}$ may also be used for different level control systems in the vehicle, for example the suspension (ELC). The actuation pressure $P_{air\_act}$ may also be used for actuation of the clutch 103.

The pressure P may also in some cases correspond to a hydraulic pressure $P_{hyd}$, whereat the pressure threshold value $P_{th}$ constitutes a hydraulic pressure threshold value $P_{hyd\_th}$. The comparisons with the threshold values are then carried out in a corresponding manner for the hydraulic pressures, as is described for the air pressures above.

The air pressure and/or hydraulic pressure may thus be used in the brake system or in the gear system, and in order to manoeuvre devices, such as for example valves, dampers, actuators or similar, in the vehicle. The evaluation of the system conditions thus secures the function for these systems during the engine shutdown.

According to one embodiment of the present invention, the evaluation 403 of whether the combustion engine 101 may be shut down comprises of a comparison of a charging status L for one or several batteries in the vehicle with a charge threshold value $L_{th}$, which ensures that sufficient charging for the batteries is available before the engine shutdown to operate an electric motor 121 in a hybrid vehicle, or in order to operate a starting engine during the engine shutdown, which starting engine is used to start the combustion engine 101 again. It may also be ensured that the batteries are sufficiently charged to operate other electrically operated systems in the vehicle.

According to one embodiment of the present invention, the evaluation 403 of whether the combustion engine 101 may be shut down comprises a comparison of a temperature T in the vehicle with a desirable temperature interval [$T_{min}$, $T_{max}$]. This temperature T may, for example, correspond to an engine temperature $T_e$, whereat the temperature interval consists of an engine temperature interval [$T_{e\_min}$, $T_{e\_max}$]. The temperature T may also correspond to a cabin temperature $T_h$, whereat the temperature internal consists of a cabin temperature interval [$T_{h\_min}$, $T_{h\_max}$]. The temperature T may also correspond to a catalyst temperature $T_c$ in an exhaust treatment system, whereat the temperature interval consists of a catalyst temperature interval [$T_{c\_min}$, $T_{c\_max}$].

According to one embodiment of the present invention, the evaluation 403 of the shutdown of the combustion engine 101 comprises, in the third step, a comparison of the simulated future speed profile $v_{sim\_coast}$ with a maximum permitted speed defined for the road section $v_{max}$. Based on the comparison, it is then determined whether at least one or several of the brake systems 170 in the vehicle will need to be activated during the road section, in order to prevent that the maximum permitted speed $v_{max}$ is exceeded.

As mentioned above, some brake systems and/or some types of decelerations require that the combustion engine is running. According to one embodiment, the evaluation 403 of the engine shutdown therefore comprises a determination of whether the combustion engine 101 must be running for a required braking action to be achievable by the one or several brake systems 170, in order to prevent that the maximum permitted speed $v_{max}$ is exceeded. For example, this determination may comprise a determination of whether, and if so how much, a retarder needs to be cooled, in order to carry out the deceleration, following which it may be determined whether or not the combustion engine must be running, in order to operate the cooling system. Corresponding determinations may also be carried out for other brake systems in the vehicle.

The evaluation 403 of the engine shutdown may also comprise a determination of a braking energy $E_{brake}$, which will be released, that is to say be converted/turned into another energy form, at the activation of the one or several brake systems 170. This braking energy $E_{brake}$ may here be determined based on at least one simulated braking profile $F_{sim\_brake}$. This at least one simulated braking force profile $F_{sim\_brake}$ is in turn determined at least based on the one or several future speed profiles $v_{sim\_coast}$ and on the maximum permitted speed $v_{max}$. The maximum permitted speed $v_{max}$ is here used to find out when the vehicle will need to be decelerated.

Figure 5:
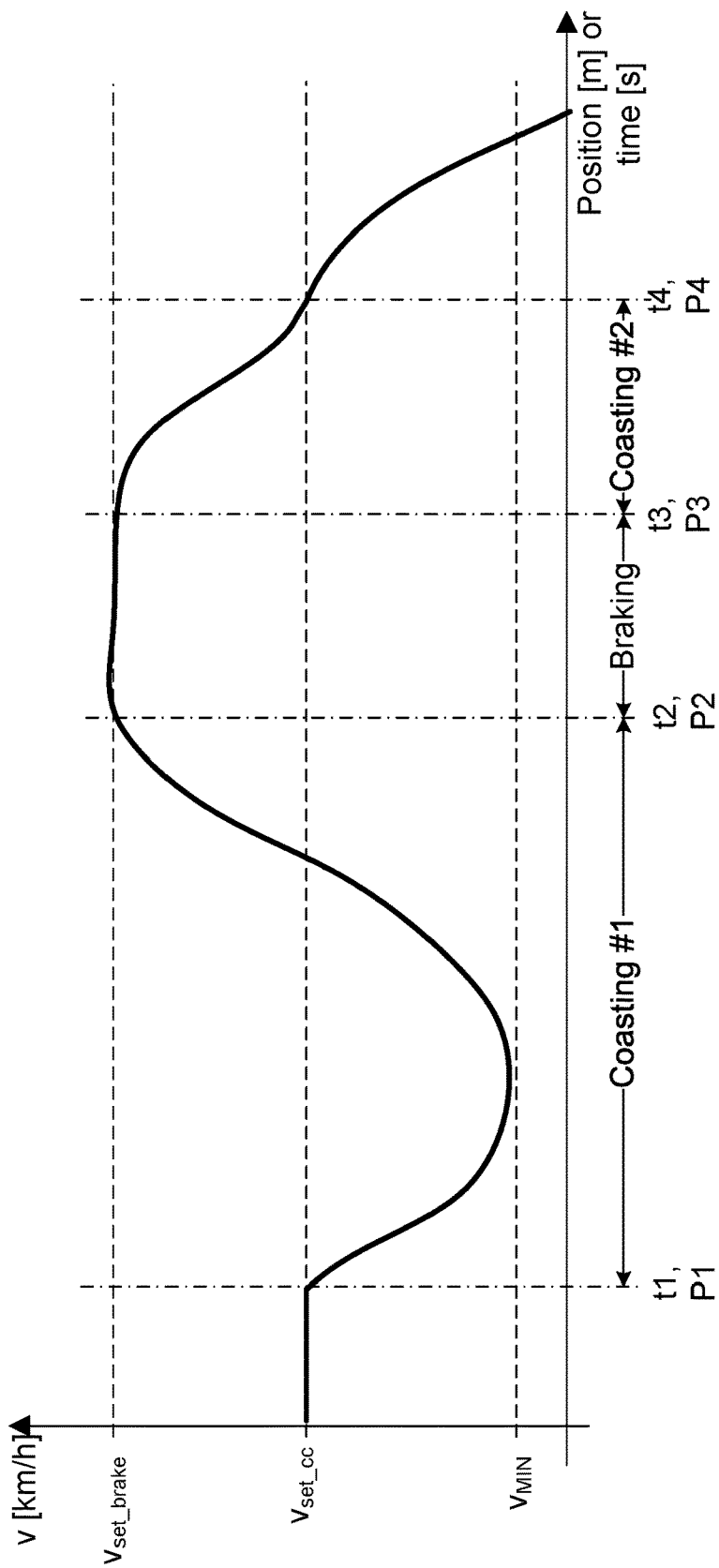
FIG. 5 shows an example of a simulation according to the invention.

FIG. 5 shows a non-limiting example of a speed profile for a vehicle during a road section.

Here, the method starts with a simulation carried out at a first point in time t1, corresponding to a first position P1. Thus, the at least one future speed profile $v_{sim\_coast}$ here simulates coasting during an initial time period T12, from the first point in time t1 to a second point in time t2 corresponding to a second position P2, at which braking will be required, since the actual vehicle speed will then exceed a maximum permitted speed, which is specified in the figure as a braking speed $v_{max} = v_{set\_brake}$. Braking will here be required during a braking period T23, from the second point in time t2 to a third point in time t3 corresponding to a third position P3, at which the actual vehicle speed falls below the maximum permitted speed $v_{max}$.

Subsequently, a second coasting period T34 is simulated, from the third point in time t3 to a fourth point in time t4 corresponding to a fourth position P4, at which a driving force $F_{drive}$ again will be required on the vehicle.

For example, this fourth point in time t4 may correspond to the point in time, when the at least one future speed profile $v_{sim\_coast}$ falls below a set speed $v_{set}$ for a cruise control one final time, before the at least one future speed profile $v_{sim\_coast}$ falls below the minimum permitted speed $v_{min}$. This example is shown schematically in FIG. 5.

If the braking energy $E_{brake}$, which is released at the braking T23, is smaller than or equal to a brake energy threshold value $E_{brake\_th}$; $E_{brake} \leq E_{brake\_th}$; the evaluation 403 of the engine shutdown results, according to one embodiment of the present invention, in a shutdown of the combustion engine 101 being deemed applicable during a time period $T_{14}$; $T_{ICE\_off} = T_{14}$; from the first point in time $t_1$, when said simulation 401 of the at least one future speed profile $v_{sim\_coast}$ is carried out, until the fourth point in time $t_4$. The fourth point in time $t_4$ here comes after the first point in time $t_1$. Thus, the combustion engine 101 will here be controlled to be shut down during the time period $T_{14}$; $T_{ICE\_off} = T_{14}$; comprising the first coasting, braking and the second coasting, to save fuel. In other words, the braking may here be carried out without any need to start the combustion engine, since the braking energy $E_{brake}$ is so small that, for example, no engine driven cooling of the brake systems is required.

If instead the braking energy $E_{brake}$ is greater than a brake energy threshold value $E_{brake\_th}$; $E_{brake} > E_{brake\_th}$, the evaluation 403 of the engine shutdown will result in a shutdown of the combustion engine 101 being deemed applicable only during a time period $T_{12}$; $T_{ICE\_off}=T_{12}$; from the first point in time $t_1$, when the simulation 401 is carried out, until the second point in time $t_2$, at which the one or several brake systems 170 must be activated. The second point in time $t_2$ here comes after the first point in time $t_1$. Accordingly, the combustion engine 101 will here be controlled to be shut down only during the time period $T_{12}$; $T_{ICE\_off}=T_{12}$; comprising only the first coasting, to save fuel. In other words, the deceleration here requires that the combustion engine is running, since the braking energy $E_{brake}$ is so great that, for example, an engine driven cooling of the brake system is required.

As indicated above, the braking energy threshold value $E_{brake\_th}$, used at the evaluation 403 of the engine shutdown, depends on one or several properties for the one or several brake systems 170 to be used to brake the vehicle. These properties may comprise, among others, a braking force provided by the respective one or several brake systems 170, and/or a cooling requirement of one or several brake systems 170.

According to one embodiment of the present invention, the evaluation 403 of the engine shutdown comprises a comparison of the shutdown period $T_{ICE\_off}$, during which the combustion engine 101 could be shut down, with a shutdown time threshold $T_{ICE\_off\_th}$. Here, the shutdown of the combustion engine 101 is deemed applicable, if the shutdown period $T_{ICE\_off}$ is longer than a shutdown time threshold $T_{ICE\_off\_th}$; $T_{ICE\_off}>T_{ICE\_off\_th}$. Thus, interspersed and inconsistent shutdown and start of the combustion engine is prevented, since the shutdown is only evaluated as applicable, if it may be carried out for a longer time period, that is to say during a time period which is perceived as acceptable, in terms of driveability, for a driver of the vehicle.

According to the present invention, the vehicle is coasting in connection with the engine shutdown. A determination of whether coasting is applicable or not may, as described partly above, for example be based on the one or several simulated future speed profiles $v_{sim\_coast}$, and one or several of a minimum permitted speed venin, below which the vehicle should not fall, and a maximum permitted speed $v_{max}$, which an actual speed of the vehicle 100 should not exceed. By comparing the simulated future speed profiles $v_{sim\_coast}$ with these maximum and/or minimum permitted speeds, a controlled coasting may be achieved.

At coasting, a very fuel efficient driving of the vehicle may be achieved with the use of an open clutch or neutral gear, if this is suitable for the road section ahead of the vehicle.

The magnitude of the minimum permitted speed $v_{min}$, that is to say the level of the minimum permitted speed $v_{min}$, is, according to one embodiment, related to a current actual speed $v_{act}$ of the vehicle. The magnitude of the maximum permitted speed $v_{max}$ is, according to one embodiment, related to a constant speed braking speed $d_{hsc}$ for the vehicle.

The minimum permitted speed $v_{min}$ and/or the maximum permitted speed $v_{max}$ may be altered dynamically, and may have different values for different transmission modes.

The magnitude of the minimum permitted speed $v_{min}$ may, according to one embodiment, be determined at least partly based on information related to a cruise control system in the vehicle, for example based on a set speed $v_{set}$, that is to say a driver selected speed, for a cruise control system, or based on a reference speed $v_{ref}$, which is used by the cruise control system to control a speed governor. The determination of the minimum permitted speed $v_{min}$ may also be carried out by the cruise control system, and be provided to the system according to the present invention.

According to one embodiment of the present invention, the system according to the present invention is integrated, at least partly, with cruise control logic in a cruise control system in the vehicle. The minimum permitted speed $v_{min}$ may then be controlled by the vehicle's cruise control logic. For example, an intelligent cruise control reduces the vehicle speed before downhill slopes, since the vehicle will accelerate anyway during the downhill slope. According to this embodiment, the cruise control may also initiate a reduction of the minimum permitted speed $v_{min}$, and thus extend the period of coasting and/or of the highest possible gear for the vehicle. This reduction of the minimum permitted speed $v_{min}$ may, for example, be achieved if the minimum permitted speed $v_{min}$ is related to the reference speed $v_{ref}$, which is the setpoint value that is reduced by the cruise control before the downhill slope, so that the control of the minimum permitted speed $v_{min}$ is achieved automatically. For example, the minimum permitted speed $v_{min}$ may constitute a percentage of the reference speed $v_{ref}$.

Generally, the speed threshold values used by the present invention, that is to say the minimum permitted speed $v_{min}$ and the maximum permitted speed $v_{max}$, may be determined in numerous different ways. For example, the driver may set these threshold values, they may constitute a percentage of an actual speed $v_{act}$ of the vehicle, they may constitute a percentage of a set speed $v_{set}$ for the cruise control system in the vehicle and/or they may be based on historic driving of the vehicle. Historic driving may be considered, for example, via the use of an adaptive algorithm, which is updated during the vehicle's progress.

As a non-limiting example, the following values could be used for the speed threshold values in this document:

a. $v_{min}=82$ km/h or $v_{min}=0.98*v_{set}$ km/h;
b. $v_{max}=90$ km/h or $v_{max}=1.06*v_{set}$ km/h, or $v_{max}=0.995*v_{dhsc}$ km/h; and
c. $v_{lim}=85$ km/h or $v_{min}=1*v_{set}$ km/h.

As described above, the road gradient may be determined based on map data and positioning information. If such data is not available, the simulations may be based on estimates of the road gradient experienced by the vehicle at the time of simulation. This places greater requirements on the magnitude of the minimum permitted speed venin and/or the maximum permitted speed $v_{max}$, since the simulations become less accurate and more varying in size. In addition the length of the horizon, that is to say the road section, according to one embodiment of the invention, may be shortened to prevent such variations.

Where the road gradient for the road section is approximated with the road gradient experienced by the vehicle at the simulation itself, the best result will be obtained at a slight downhill slope. Slight downhill slopes are ideal for coasting if, for example, the road gradient is such that the simulated speed $v_{sim}$ is within its permitted interval, between the minimum permitted speed venin and the maximum permitted speed $v_{max}$.

One advantage with simulating future speed profiles based on the current gradient, is that the same algorithm may be used for both roads and vehicles when there is no access to the future road gradient, as well as for roads and vehicles when there is access to the future road gradient. In addition, the simulation uses speed dependent terms, such as e.g. air resistance and engine torque, so that a good estimate of how the vehicle will behave in the future is obtained, even without any knowledge about the future road gradient.

A person skilled in the art will realize that a method for control of the combustion engine for at least one system according to the present invention, may also be implemented in a computer program, which when executed in a computer will cause the computer to carry out the method. The computer program usually consists of a computer program product 603 stored on a digital storage medium, where the computer program is comprised in the computer program products' computer readable medium. Said computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 6:
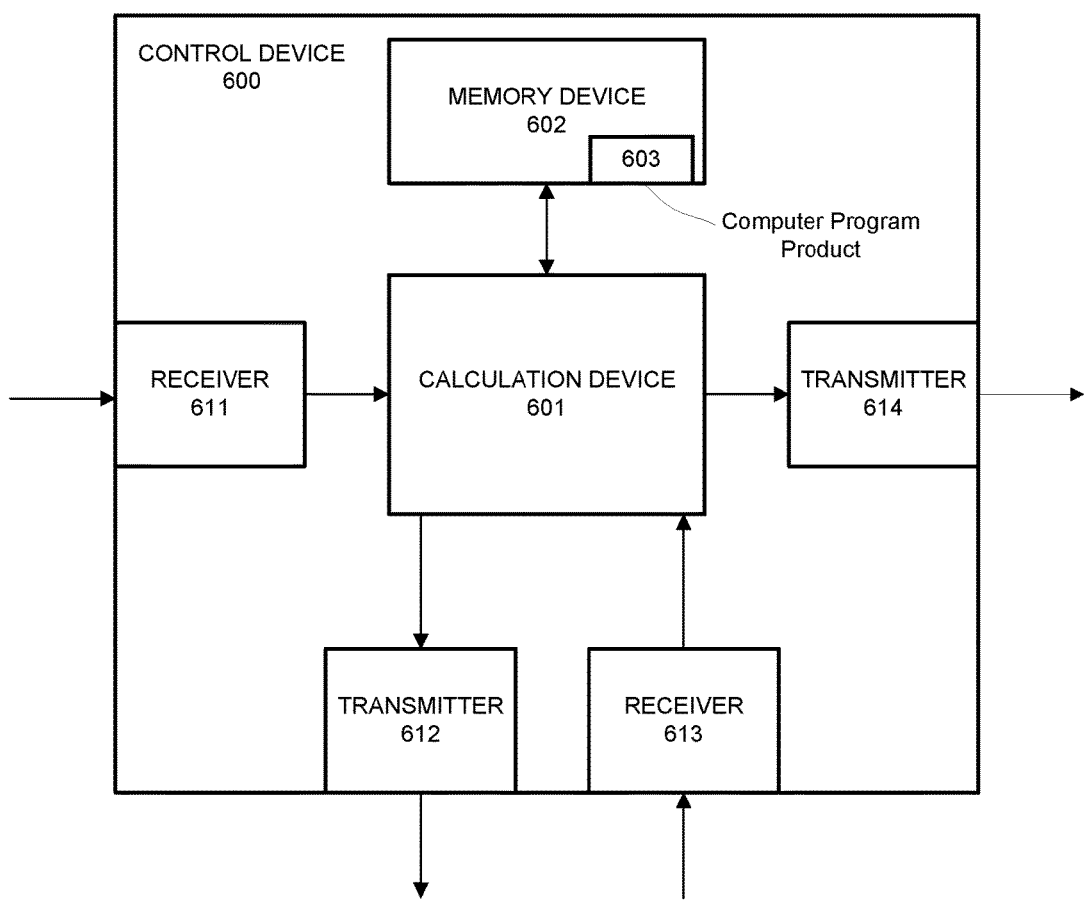
FIG. 6 shows a control device, in which the present invention may be implemented.

FIG. 6 schematically shows a control device 600. The control device 600 comprises a calculation device 601, which may consist of substantially any suitable type of processor or microcomputer, e.g. a circuit for digital signal processing (Digital Signal Processor, DSP), or a circuit with a predetermined specific function (Application Specific Integrated Circuit, ASIC). The calculation device 601 is connected to a memory unit 602 installed in the control device 600, providing the calculation device 601 with e.g. the stored program code and/or the stored data, which the calculation device 601 needs in order to be able to carry out calculations. The calculation unit 601 is also set up to store interim or final results of calculations in the memory unit 602.

Further, the control device 600 is equipped with devices 611, 612, 613, 614 for receipt and sending of input and output signals, respectively. These input and output signals may contain wave shapes, pulses, or other attributes, which may be detected as information by the devices 611, 613 for the receipt of input signals, and may be converted into signals that may be processed by the calculation device 601. These signals are then provided to the calculation device 601. The devices 612, 614 for sending of output signals are arranged to transform signals received from the calculation device 601 for the creation of output signals by e.g. modulating the signals, which may be transmitted to other parts of and/or systems in the vehicle.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection. A person skilled in the art will realized that the above-mentioned computer may consist of the calculation device 601, and that the above-mentioned memory may consist of the memory unit 602.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown, thus often comprise significantly more control devices than what is shown in FIG. 6, which is well known to a person skilled in the art within the technology area.

The present invention, in the embodiment displayed, is implemented in the control device 600. The invention may also be implemented wholly or partly in one or several other control devices already existing in the vehicle or in a control device dedicated to the present invention.

A person skilled in the art will obviously realized that speeds and speed threshold values which are specified in this document have equivalents and may be translated into engine speed and engine speed thresholds or torque and torque threshold values. Likewise, a person skilled in the art will realize that there is a very well-known correlation between distances, times and speeds, so that the times and time periods specified herein have equivalents in positions and distances.

A person skilled in the art will also realize that the above system may be modified according to the different embodiments of the method according to the invention. In addition, the invention relates to a motor vehicle 100, for example a truck or bus, comprising at least one system for control of the combustion engine according to the invention.

The present invention is not limited to the embodiments of the invention described above, but relates to and comprises all embodiments within the protected scope of the enclosed independent claims.

The invention claimed is:

1. A method for control of a combustion engine during a road section, in a vehicle comprising one or several engines and one or several brake systems, wherein a minimum permitted speed $v_{min}$ and a maximum permitted speed $v_{max}$, between which an actual speed $v_{act}$ for said vehicle should be kept, are defined for said road section, wherein said method comprises:
simulation of at least one future speed profile $v_{sim\_coast}$ for an actual speed $v_{act}$ of said vehicle during said road section, wherein said simulation is carried out when said road section is ahead of said vehicle, and wherein said simulation of each one of said at least one future speed profile $v_{sim\_coast}$ is based on information about said road section, and assumes that coasting will be applied at least partly during said road section;
evaluation of an applicability for coasting, wherein said coasting is deemed applicable for a speed profile $v_{sim\_coast}$, if its value is greater than said minimum permitted speed $v_{min}$ at least during an initial part of said road section;
evaluation of whether said combustion engine may be shut down during said coasting during at least a part of said road section, wherein said evaluation of the shutdown of said combustion engine is based at least on whether one or several system conditions for engine shutdown are met, on one or several properties for said one or several brake systems, and on a shutdown period $T_{ICE\_off}$, when said combustion engine could be shut down, wherein said evaluation of said shutdown of said combustion engine comprises:
comparison of said future speed profile $v_{sim\_coast}$ with said maximum permitted speed $v_{max}$; and
determination of whether at least one of said one or several brake systems will need to be activated, on order to prevent that said maximum permitted speed $v_{max}$ is exceeded,
wherein, if said one or several brake systems must be activated, said evaluation of said shutdown of said combustion engine comprises determining whether said combustion engine must be running for the required braking action to be achieved by said one or several brake systems, in order to prevent that said maximum permitted speed $v_{max}$ is exceeded; and
control of said combustion engine based on said evaluation of the shutdown of said engine.

2. A method according to claim 1, wherein said coasting is achieved by way of one or several from among the group:

an opening of a clutch in said vehicle; and
a shift operation to a neutral gear in a gearbox in said vehicle.

3. A method according to claim 1, wherein, if said one or several brake systems are activated, said evaluation of said shutdown of said combustion engine comprises determination of a braking energy $E_{brake}$, which will be released at the activation of said one or several brake systems.

4. A method according to claim 3, wherein said braking energy $E_{brake}$ is determined based on at least one simulated braking force profile $F_{sim\_brake}$, wherein said at least one simulated braking force profile $F_{sism\_brake}$ is determined based on said at least one future speed profile $v_{sim\_coast}$ and said maximum permitted speed $v_{max}$.

5. A method according to claim 3, wherein said evaluation of said shutdown of said combustion engine results in a shutdown of said combustion engine being deemed applicable for a time period $T_{14}$; $T_{ICE\_off}=T_{14}$; from a first point in time $t_1$, when said simulation of said at least one future speed profile $v_{sim\_coast}$ is carried out, to a fourth point in time $t_4$, after said first point in time $t_1$, when a propulsion force $F_{drive}$ of said vehicle will be needed again, if said braking energy $E_{brake}$ is smaller than or equal to a brake energy threshold value $E_{brake\_th}$; $E_{brake} \leq E_{brake\_th}$.

6. A method according to claim 5, wherein said propulsion force will be required, when said at least one future speed profile $v_{sim\_coast}$ falls below a set speed $v_{set}$ for a cruise control the last time, before said at least one future speed profile $v_{sim\_coast}$ falls below said minimum permitted speed $v_{min}$.

7. A method according to claim 5, wherein said braking energy threshold value $E_{brake\_th}$ depends on said one or several properties for said one or several brake systems.

8. A method according to claim 7, wherein said one or several properties comprise a braking force, provided by the respective one or several brake systems.

9. A method according to claim 3, wherein said evaluation of said shutdown of said combustion engine results in a shutdown of said combustion engine being deemed applicable for a time period $T_{12}$; $T_{ICE\_off}=T_{12}$; from a first point in time $t_1$, when said simulation of said at least one future speed profile $v_{sim\_coast}$ is carried out, to a second point in time $t_2$, after said first point in time $t_1$, when said one or several brake systems must be activated, if said braking energy $E_{brake}$ is greater than a braking energy threshold value $E_{brake\_th}$; $E_{brake} > E_{brake\_th}$.

10. A method according to claim 1, wherein said fulfilment of said one or several system conditions for engine shutdown comprises that one or several of the following are fulfilled:
an air pressure $P_{air\_brake}$ in said one or several brake systems exceeds a pressure threshold value $P_{air\_brake\_th}$; $P_{air\_brake} > P_{air\_brake\_th}$;
an air pressure $P_{air\_act}$, which is used for the above described actuation of one or several devices in said vehicle exceeds a pressure threshold value $P_{air\_act\_th}$; $P_{air\_act} > P_{air\_act\_th}$;
a charging status L for one or several batteries in said vehicle exceeds a charging threshold value $L_{th}$; $L > L_{th}$;
an engine temperature $T_e$ is within an engine temperature interval $[T_{e\_min}, T_{e\_max}]$; $T_{e\_min} < T_e < T_{e\_max}$;
a catalyst temperature $T_c$ is within a catalyst temperature interval $[T_{c\_min}, T_{c\_max}]$; $T_{c\_min} < T_c < T_{c\_max}$;
a cabin temperature $T_h$ is within a cabin temperature interval $[T_{h\_min}, T_{h\_max}]$; $T_{h\_min} < T_h < T_{h\_max}$; and
a powertrain status D indicates that a powertrain in the vehicle has an acceptable function.

11. A method according to claim 1, wherein said shutdown period $T_{ICE\_off}$, when said combustion engine could be shut down, is determined based at least on said at least one future speed profile $v_{sim\_coast}$.

12. A method according to claim 1, wherein:
said evaluation of the shutdown of said combustion engine comprises a comparison of said shutdown period $T_{ICE\_off}$ when said combustion engine could be shut down, with a shutdown time threshold $T_{ICE\_off\_th}$; and
said shutdown of said combustion engine is deemed applicable, if said shutdown period $T_{ICE\_off}$ is longer than said shutdown period threshold $T_{ICE\_off\_th}$; $T_{ICE\_off} > T_{ICE\_off\_th}$.

13. A method according to claim 1, wherein a magnitude of said maximum permitted speed $v_{max}$ is related to a constant speed brake speed $v_{dhsc}$ for said vehicle.

14. A method according to claim 1, wherein a magnitude of said maximum permitted speed $v_{max}$ changes dynamically.

15. A method according to claim 1, wherein a magnitude for said minimum permitted speed $v_{min}$ is determined at least partly based on information related to a cruise control system in said vehicle.

16. A method according to claim 15, wherein said determination of said magnitude for said minimum permitted speed $v_{min}$ is carried out by said cruise control system.

17. A method according to claim 1, wherein said controlling said combustion engine comprises, during coasting, determining a time period where said at least one of said one or several brake systems do not need to be activated during coasting, and shutting down of said combustion engine during the time period.

18. A non-transitory computer-readable medium readable by a computer storing a computer program product comprising computer program code, said computer program product used for control of a combustion engine during a road section, in a vehicle, comprising one or several engines and one or several brake systems, wherein a minimum permitted speed $v_{min}$ and a maximum permitted speed $v_{max}$, between which an actual speed $v_{act}$ for said vehicle should be kept, are defined for said road section, said computer program code comprising computer instructions to cause one or more computer processors to perform the operations of:
simulation of at least one future speed profile $v_{sim\_coast}$ for an actual speed $v_{act}$ of said vehicle during said road section, wherein said simulation is carried out when said road section is ahead of said vehicle, and wherein said simulation of each one of said at least one future speed profile $v_{sim\_coast}$ is based on information about said road section, and assumes that coasting will be applied at least partly during said road section;
evaluation of an applicability for coasting, wherein said coasting is deemed applicable for a speed profile $v_{sim\_coast}$, if its value is greater than said minimum permitted speed $v_{min}$ at least during an initial part of said road section;
evaluation of whether said combustion engine may be shut down during said coasting during at least a part of said road section, wherein said evaluation of the shutdown of said combustion engine is based at least on whether one or several system conditions for engine shutdown are met, on one or several properties for said one or several brake systems, and on a shutdown period $T_{ICE\_off}$, when said combustion engine could be shut down, wherein said evaluation of said shutdown of said combustion engine comprises:
comparison of said future speed profile $v_{sim\_coast}$ with said maximum permitted speed $v_{max}$; and
determination of whether at least one of said one or several brake systems will need to be activated, on order to prevent that said maximum permitted speed $v_{max}$ is exceeded,
wherein, if said one or several brake systems must be activated, said evaluation of said shutdown of said combustion engine comprises determining whether said combustion engine must be running for the required braking action to be achieved by said one or several brake systems, in order to prevent that said maximum permitted speed $v_{max}$ is exceeded; and
control of said combustion engine based on said evaluation of the shutdown of said engine.

19. A system arranged for control, during a road section, of a combustion engine in a vehicle comprising one or several engines, and one or several brake systems, wherein a minimum permitted speed $v_{min}$ and a maximum permitted speed $v_{max}$, which an actual speed $v_{act}$ for said vehicle should be kept in between, are defined for said road section, said system comprising:
 a simulation unit, arranged for simulation of at least one future speed profile $v_{sim\_coast}$ for an actual speed $v_{act}$ of said vehicle during said road section, wherein said simulation is carried out when said road section is ahead of said vehicle, and wherein said simulation of each one of said at least one future speed profile $v_{sim\_coast}$ is based on information about said road section, and assumes that coasting will be applied at least partly during said road section;
 a first evaluation unit, arranged for evaluation of an applicability for coasting, wherein said coasting is deemed applicable for a speed profile $v_{sim\_coast}$ if its value is greater than said minimum permitted speed $v_{min}$, at least during an initial part of said road section;
 a second evaluation unit, arranged for evaluation of whether said combustion engine may be shut down during said coasting, during at least a part of said road section, wherein said evaluation of the shutdown of said combustion engine is based at least partly on whether one or several system conditions for engine shutdown are met, on one or several properties for said one or several brake systems, and on a shutdown period $T_{ICE\_off}$, when said combustion engine could be shut down, wherein said evaluation of said shutdown of said combustion engine comprises:
comparison of said future speed profile $v_{sim\_coast}$ with said maximum permitted speed $v_{max}$; and
determination of whether at least one of said one or several brake systems will need to be activated, on order to prevent that said maximum permitted speed $v_{max}$ is exceeded,
wherein, if said one or several brake systems must be activated, said evaluation of said shutdown of said combustion engine comprises determining whether said combustion engine must be running for the required braking action to be achieved by said one or several brake systems, in order to prevent that said maximum permitted speed $v_{max}$ is exceeded; and
an engine control unit, arranged for control of said combustion engine based on said evaluation of the shutdown of said engine.

* * * * *